S. MOWRY.
Grain-Drill.
No. 25,031. Patented Aug. 9. 1859.
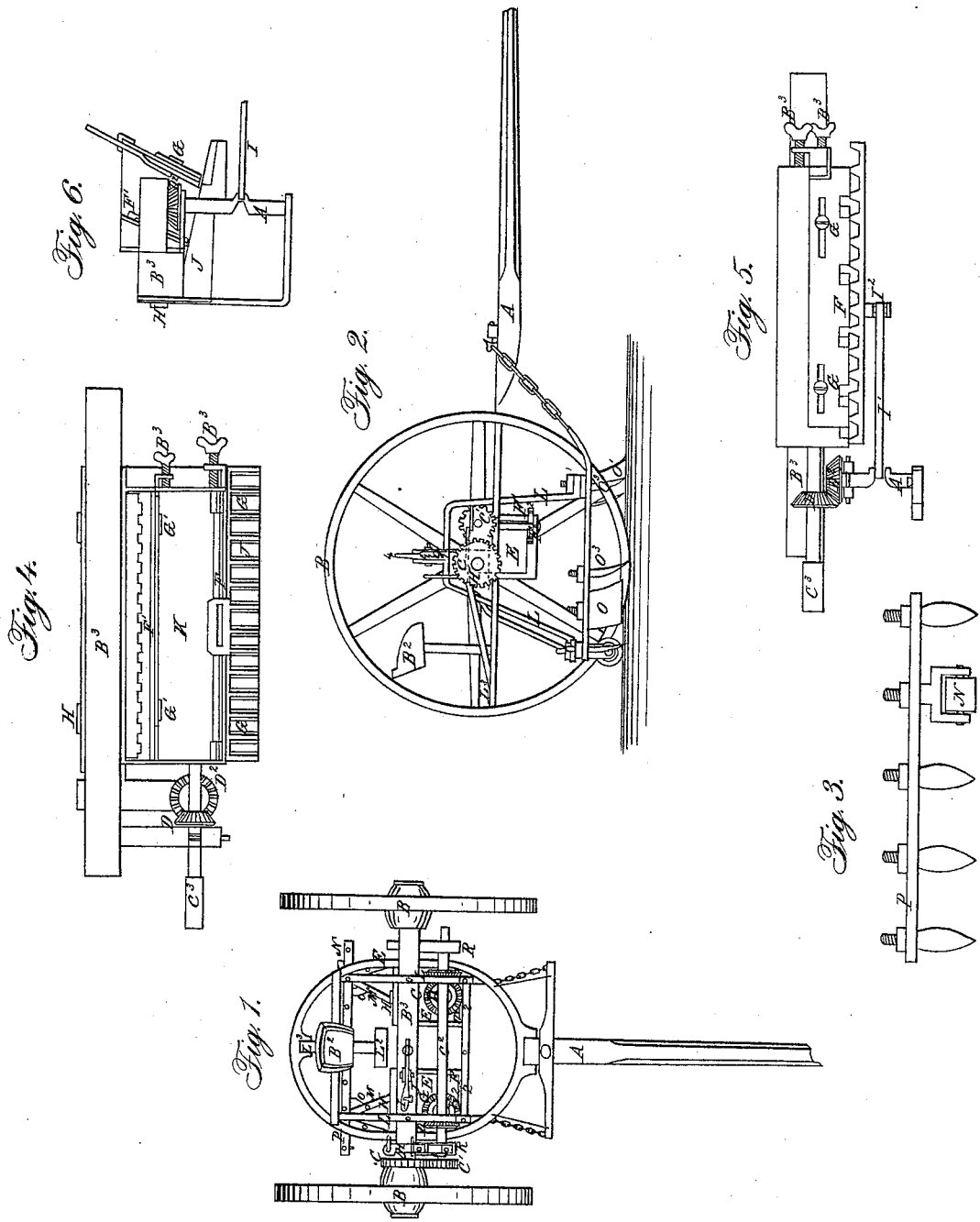

UNITED STATES PATENT OFFICE.

SAMUEL MOWRY, OF WOMELSDORF, PENNSYLVANIA.

IMPROVEMENT IN CULTIVATORS.

Specification forming part of Letters Patent No. 25,031, dated August 9, 1859.

*To all whom it may concern:*

Be it known that I, SAMUEL MOWRY, of Womelsdorf, in the county of Berks and State of Pennsylvania, have invented a new and Improved Cultivator; and I hereby declare that the following is a full and exact description thereof, reference being had to the accompanying drawings, and to the letters of reference marked thereon.

The nature of my invention consists in the arrangement of devices hereinafter described.

To enable others skilled in the art to make and use my invention, I will proceed to describe its construction and operation, the letters of reference on the respective figures referring to the same parts.

Figure 1 is a plan of my machine, and Fig. 2 a cross or longitudinal section of the same. Fig. 3 shows a series of cultivators and roller attached to the cross-bar P. Fig. 4 shows a plan of the seeder and distributers; Fig. 5, a front view, and Fig. 6 a cross-section, of the same.

A, Fig. 1, is the tongue or draft-piece; B, the wheels, by which the machine is conveyed from place to place; $B^2$, the seat; C, a wheel connected with the hub of the wheel working the pinion C' for the purpose of working the wheels D D, which give motion to the seed-regulators F, which are attached to and at the bottom of the box E. The regulator F extends out in front of the box E, and the seed is leveled off in the holes F' as it passes under the opening cut in the under edge of the box at 2.

H' is a lever for throwing the pinion C' out of gear. I is a lever and J a ratchet-bar for the purpose of raising and holding the cultivators from the ground when not in use.

L are stretcher-bars, which rest on screw-bolts, which attach to the axle and keep the stretcher-bars in their places, and, being turned by the crank 4, Fig. 2, raise or lower the cultivator-frames M as desired. The foot-piece $L^2$, attached to the lever $L^3$, is for the purpose of pressing the cultivators down to their work.

N is a roller for covering or pressing the ground when planting corn.

O are mold-boards for furrowing or cultivating between rows of corn.

P, Fig. 3, is a cultivator-bar attached to the frames M.

In case I wish to cultivate land or prepare it for seeding I remove the mold-boards O and O' and coverers $O^3$, Fig. 2, and the roller N, Fig. 3, and place in shovels at the four angles of the frame M. When planting corn I remove all the shovels out of the bar P, Fig. 3, and frames M, and put in the mold-boards O', coverers $O^3$, and roller N.

In case I wish to cultivate corn between the rows I take out roller N, coverers $O^3$, and mold-boards O', and insert the shovels only at the angles in frames M, as before described. At the second time of cultivating between the rows of corn I add the two mold-boards O to each frame M.

In case I wish to sow grain and grass-seeds I take out of the frames M the mold-board O and the seed-boxes E, shaft $C^2$, and wheels D and attach the seed-box K, Fig. 4, to the axle of the carriage. The pinion C, Fig. 1, being taken off and placed on the shaft $C^3$, Figs. 4 and 5, motion is given to seed-distributers J and F, Fig. 4, by the cog-wheel C, attached to the hub of the carriage-wheel B, which gives motion to the crank-shaft A, Fig. 5, the feed being gaged by the set-screws $B^3$, Figs. 4 and 5.

G, Figs. 4 and 5, are set-screws for guiding the feed-regulator.

F and G' are set-screws for guiding the regulator F' when it is desired to sow grass-seeds.

H, Figs. 4 and 6, are set-screws for fastening the seed-distributer to the axle, the bearing R, Fig. 1, remaining stationary to receive the shaft $C^3$, Fig. 5.

I, Figs. 5 and 6, is the connecting-rod, which gives motion to the seed-distributer J, Figs. 4 and 6. This distributer, which serves also as a bottom to the seed-box, is moved back and forth by the connecting-rod I, and slides on the bolts H, Fig. 4.

The particular advantages of this kind of cultivator are that it will perform as much work with one man and two horses as two men and four horses are able to do with any other machine used, and that the gearing is kept free from dirt and other obstructions while working above the boxes E, thereby saving the farmer expense.

Having thus fully described my improved machine, what I claim as new, and desire to secure by Letters Patent, is—

The arrangement of the axles $B^3$, wheels B, stretcher-bars L, levers H, I, and $L^3$, frames M, wheel C, ratchet-bar J, and cultivator-bar P, the whole being constructed as described, for the purpose set forth.

SAMUEL MOWRY.

Witnesses:
JOHN HAAK,
DANIEL G. FELIX.